United States Patent
Nakagawa et al.

(10) Patent No.: US 9,511,570 B2
(45) Date of Patent: *Dec. 6, 2016

(54) SURFACE LAYER MATERIAL AND MELAMINE DECORATIVE LAMINATE

(75) Inventors: Hiroshige Nakagawa, Tokyo (JP); Toshinori Kifuku, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/995,782

(22) PCT Filed: Dec. 22, 2010

(86) PCT No.: PCT/JP2010/073199
§ 371 (c)(1),
(2), (4) Date: Jun. 19, 2013

(87) PCT Pub. No.: WO2012/086032
PCT Pub. Date: Jun. 28, 2012

(65) Prior Publication Data
US 2013/0273352 A1 Oct. 17, 2013

(51) Int. Cl.
*B32B 27/42* (2006.01)
*B05D 3/00* (2006.01)
(Continued)

(52) U.S. Cl.
CPC .............. *B32B 27/42* (2013.01); *B32B 15/12* (2013.01); *B32B 15/20* (2013.01); *B44C 5/04* (2013.01);
(Continued)

(58) Field of Classification Search
CPC .......... B32B 27/42; B32B 15/12; B32B 15/20; B32B 2255/12; B32B 2255/26; B32B 2255/28; B32B 2450/00; B44C 5/04; B44C 5/0415; D21H 27/26; Y10T 428/31522; Y10T 428/31594; Y10T 428/254; Y10T 428/269
(Continued)

(56) References Cited

U.S. PATENT DOCUMENTS 3,697,350 A * 10/1972 Yamanouchi et al. ........ 156/245
4,801,495 A *  1/1989 van der Hoeven ........... 442/412
(Continued)

FOREIGN PATENT DOCUMENTS

CN          101165075 A  *  4/2008
CN          101175634 A      5/2008
(Continued)

OTHER PUBLICATIONS

International Search Report of PCT/JP2010/073199, mailing date of Apr. 12, 2011.

*Primary Examiner* — Thao T Tran
(74) *Attorney, Agent, or Firm* — Westerman, Hattori, Daniels & Adrian, LLP

(57) ABSTRACT

The present invention provides a surface layer material for a melamine decorative laminate having an aluminum layer, allowing 3R or less bending while maintaining the surface hardness of the melamine decorative laminate, and a melamine decorative laminate comprising the surface layer material. Disclosed is a surface layer material for a decorative laminate comprising a surface layer and an aluminum layer, the material comprising a surface layer substrate having a first surface being a design surface and a second surface being a surface on an opposite side of the design surface, wherein a melamine resin composition comprising a melamine resin is carried on the first surface, and a urethane-acrylic resin composition comprising a urethane-acrylic resin is carried on the second surface.

4 Claims, 1 Drawing Sheet

(51) Int. Cl.
*B44C 5/04* (2006.01)
*B32B 15/12* (2006.01)
*B32B 15/20* (2006.01)
*D21H 27/26* (2006.01)

(52) U.S. Cl.
CPC ............ *B44C 5/0415* (2013.01); *D21H 27/26* (2013.01); *B32B 2255/12* (2013.01); *B32B 2255/26* (2013.01); *B32B 2255/28* (2013.01); *B32B 2451/00* (2013.01); *Y10T 428/254* (2015.01); *Y10T 428/269* (2015.01); *Y10T 428/31522* (2015.04); *Y10T 428/31594* (2015.04)

(58) Field of Classification Search
USPC ..... 428/327, 339, 416, 425.3; 427/326, 410, 427/411; 156/310, 330
See application file for complete search history.

(56) References Cited

U.S. PATENT DOCUMENTS 5,169,719 A * 12/1992 Balatan ...................... 428/423.1
2008/0057276 A1* 3/2008 Rasmusson et al. ......... 428/199
2013/0230712 A1* 9/2013 Kifuku .......................... 428/220

FOREIGN PATENT DOCUMENTS

| GB | 1147188 A * | 4/1969 |
|----|-------------|--------|
| JP | 02-116544 A | 5/1990 |
| JP | 2001-096702 A | 4/2001 |
| JP | 2003-027031 A | 1/2003 |
| JP | 2005-169841 A | 6/2005 |
| JP | 2005-290034 A | 10/2005 |
| JP | 2007-030405 A | 2/2007 |
| WO | 2006/111458 A1 | 10/2006 |

* cited by examiner

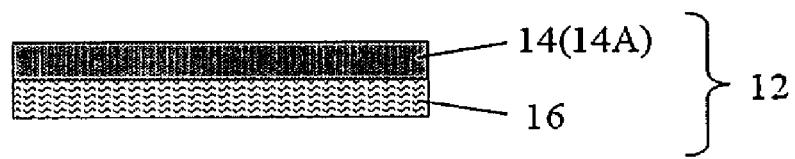

SURFACE LAYER MATERIAL AND MELAMINE DECORATIVE LAMINATE

TECHNICAL FIELD

The present invention relates to a surface layer material and a melamine decorative laminate.

BACKGROUND ART

A melamine decorative laminate is hard and excellent in water resistance, stain resistance and abrasion resistance. Accordingly, it has been used in a variety of fields, for applications such as furniture, building walls, interiors of automobiles, etc. In the melamine decorative laminate, a melamine resin-impregnated decorative paper is used as a decorative layer provided on its surface, while a phenol resin-impregnated Kraft paper, a glass fiber paper coated with a thermosetting resin and a flame retardant, or aluminum is used as its core layer. There are many melamine decorative laminates, which are made of various combinations to meet a variety of requirements. In all melamine decorative laminates, a melamine resin-containing decorative layer is formed on the surface to offer decorative laminates with excellent abrasion resistance and stain resistance. While there are such benefits, general melamine decorative laminates are hard and thus unsuitable for processing such as bending. Because of this, melamine resins that allow a 6R to 8R bending, so-called melamine resins for post-forming applications, have been developed. Post form decorative laminates produced by using the melamine resins can be heat bent and have been used in applications such as doors.

In the fields which require not only bending properties but also non-flammability, a melamine decorative laminate comprising a combination of a melamine decorative layer and aluminum is used (for example, see Patent Literature 1). In this case, to bond the melamine decorative layer and the aluminum together, a layer of phenol resin-impregnated kraft paper (phenol resin layer) is needed. The melamine decorative laminate thus produced is thicker for the phenol resin layer, so that there are limitations on the bending properties of the laminate and the bending limit is 4R even when the laminate is heated and bent.

CITATION LIST

Patent Literature 1: Japanese Patent Application Laid-Open No. 2001-096702

SUMMARY OF INVENTION

Technical Problem

The present invention provides a surface layer material for use in a surface layer, the material being configured to allow a 3R or less bending at normal temperature (130 to 180° C.), while maintaining the surface hardness the melamine resin has.

The present invention also provides a surface layer material for use in a melamine decorative laminate having an aluminum layer and a melamine decorative laminate comprising the surface layer material, the material being configured to allow a 3R or less bending at normal temperature, while maintaining the surface hardness of the melamine decorative laminate.

Solution to Problem

The above purposes can be achieved by the following (1) to (9).

(1) A surface layer material for a surface layer, the material comprising a surface layer substrate having a first surface being a design surface and a second surface being a surface on an opposite side of the design surface, wherein a melamine resin composition comprising a melamine resin is carried on the first surface, and a urethane-acrylic resin composition comprising a urethane-acrylic resin is carried on the second surface.

(2) The surface layer material according to (1), wherein the urethane-acrylic resin composition is a water-soluble clear type resin composition comprising a urethane-acrylic resin emulsion.

(3) The surface layer material according to (2), wherein the urethane-acrylic resin emulsion has an average particle diameter of 100 nm or less.

(4) A surface layer material for a decorative laminate comprising a surface layer and an aluminum layer, the material comprising a surface layer substrate having a first surface being a design surface and a second surface being a surface on an opposite side of the design surface, wherein a melamine resin composition comprising a melamine resin is carried on the first surface, and a urethane-acrylic resin composition comprising a urethane-acrylic resin is carried on the second surface.

(5) The surface layer material according to (4), wherein the urethane-acrylic resin composition is a water-soluble clear type resin composition comprising a urethane-acrylic resin emulsion.

(6) The surface layer material according to (5), wherein the urethane-acrylic resin emulsion has an average particle diameter of 100 nm or less.

(7) A melamine decorative laminate comprising the surface layer material defined by any one of (4) to (6) and an aluminum layer layered on the second surface of the surface layer material.

(8) The melamine decorative laminate according to (7), wherein a surface of the aluminum layer in contact with the surface layer material is a primer treated surface by an epoxy resin.

(9) The melamine decorative laminate according to (7) or (8), wherein the aluminum layer has a thickness of 0.1 to 0.3 mm.

Advantageous Effects of Invention

According to the present invention, a surface layer material for use in a surface layer is provided, the material being capable of a 3R or less bending at normal temperature, while maintaining the surface hardness the melamine resin has.

Also according to the present invention, a surface layer material for use in a melamine decorative laminate having an aluminum layer and a melamine decorative laminate comprising the surface layer material are provided, the material being capable of a 3R or less bending at normal temperature, while maintaining the surface hardness the melamine decorative laminate has.

BRIEF DESCRIPTION OF DRAWINGS

FIG. 1 is a schematic view showing the structure of an embodiment of the melamine decorative laminate according to the present invention.

DESCRIPTION OF EMBODIMENTS

Hereinafter, the present invention will be described in detail.

The surface layer material of the present invention is a surface layer material for a surface layer, the material comprising a surface layer substrate having a first surface being a design surface and a second surface being a surface on the opposite side of the design surface, wherein a melamine resin composition comprising a melamine resin is carried on the first surface, and a urethane-acrylic resin composition comprising a urethane-acrylic resin is carried on the second surface.

The surface layer material of the present invention is also a surface layer material for a decorative laminate comprising a surface layer and an aluminum layer, the material comprising a surface layer substrate having a first surface being a design surface and a second surface being a surface on the opposite side of the design surface, wherein a melamine resin composition comprising a melamine resin is carried on the first surface, and a urethane-acrylic resin composition comprising a urethane-acrylic resin is carried on the second surface.

Finally, the melamine decorative laminate of the present invention comprises: the surface layer material according to the present invention, which is for use in a melamine decorative laminate having a surface layer and an aluminum layer; and the aluminum layer disposed on the second surface of the surface layer material.

FIG. 1 shows the structure of an embodiment of the melamine decorative laminate according to the present invention. As shown in FIG. 1, a melamine decorative laminate 12 comprises a surface layer material 14 of the present invention and an aluminum layer 16.

In the embodiment shown in FIG. 1, the surface layer material 14 is a decorative layer material 14A. This decorative layer material 14A is arranged on the design surface side of the melamine decorative laminate 12 of the present invention. The embodiment in FIG. 1 shows the melamine decorative laminate 12 in which the decorative layer material 14A, which is the surface layer material 14, and the aluminum layer 16 are stacked. However, when there is a need for properties such as mechanical strength, unlike the embodiment shown in FIG. 1, a core layer can be further put on an open side of the aluminum layer 16, which is not in contact with the decorative layer material.

<1. Surface Layer>

The surface layer material of the present invention has a first surface which is a design surface of a surface layer substrate and is impregnated with a melamine resin composition comprising a melamine resin, and a second surface which is a surface opposite to the design surface and is impregnated with a urethane-acrylic resin composition comprising a urethane-acrylic resin.

The surface layer substrate used in the surface layer material of the present invention, is a sheet substrate that has a surface on which a design is formed (design surface) on the first surface. There is no particular limitation on the material of the substrate. However, pulp, linter, synthetic fiber, glass fiber and so on can be preferably used as the material, and a titanium oxide-containing decorative paper can be used as needed, which contains a pigment such as titanium oxide. There is no particular limitation on the basis weight of the surface layer substrate. However, a surface layer substrate having a basis weight of 40 to 150 $g/m^2$ can be preferably used.

In the surface layer material of the present invention, a melamine resin composition comprising a melamine resin is carried on the first surface of the surface layer substrate. Thereby, suitable surface hardness is provided to the surface of the surface layer and that of the decorative laminate.

As the melamine resin, there may be preferably used a melamine resin obtained by reacting melamine with formaldehyde at a reaction molar ratio of formaldehyde relative to melamine (formaldehyde/melamine) (hereinafter it may be simply referred to as reaction molar ratio) of 1.0 to 4.0, preferably 1.0 to 2.0, more preferably 1.1 to 1.8.

There may be used a urethane-acrylic resin along with the melamine resin. Because of this, there is an advance in improving the bending properties, with sustaining the surface hardness resulting from the melamine resin. In this case, the solid content ratio between the melamine resin and the urethane-acrylic resin (melamine resin: urethane-acrylic resin) is preferably 80:20 to 100:0, because the surface hardness tends to decrease as the urethane-acrylic resin increases.

In the surface layer material of the present invention, a urethane-acrylic resin composition comprising a urethane-acrylic resin is carried on the second surface of the surface layer substrate, which is a surface opposite to the design surface. Because of this, there is an advance in improving the bending properties of the surface layer. In the case of using the aluminum layer along with the surface layer, there is an increase in adhesion strength between the surface layer and the aluminum layer and also an advance in the bending properties of the melamine decorative laminate.

As the urethane-acrylic resin composition comprising a urethane-acrylic resin used herein, a water-soluble clear type urethane-acrylic resin composition comprising a urethane-acrylic resin emulsion is preferable. Urethane resins have high adhesion strength to aluminum layers, and urethane resins and acrylic resins can be present in the form of fine composite resins in fine particles of the urethane-acrylic resin emulsion, so that excellent adhesion strength to the aluminum layer is exhibited. In addition, by using the water-soluble clear type (transparent type) urethane-acrylic resin composition, it is possible to limit the influence on the color tone of the design surface of the surface layer material.

As the urethane-acrylic resin emulsion, one having an average particle diameter of 100 nm or less is preferably used. Because of this, there is an increase in penetration performance of the urethane-acrylic resin emulsion into/between the fibers of the surface layer substrate, resulting in deeper penetration of the urethane-acrylic resin emulsion into the inside of the surface layer substrate, so that excellent flexibility is provided to the surface layer. The average particle diameter of the urethane-acrylic resin emulsion can be obtained by a particle size distribution measuring device.

To produce the surface layer material of the present invention, for example, there may be mentioned a process of applying the resin composition to the first and second surfaces of the surface layer substrate by coating or the like so that the resin compositions are carried on the substrate. The coating amount is preferably 35 to 90 $g/m^2$ in terms of solid content (when dried).

To apply the resin composition, for example, there may be used means such as a spray device, shower device, kiss coater and comma coater. Then, the applied resin composition is heat-dried at about 80 to 130° C. to remove most of the solvent, thus obtaining the surface layer material of the present invention.

After the aluminum layer and so on are stacked on the surface layer material, the surface layer material is referred to as a surface layer. When the surface layer material is used in a decorative laminate, the surface layer material may be referred to as "decorative layer material", while the surface layer may be referred to as "decorative layer".

<2. Aluminum Layer>

The melamine decorative laminate of the present invention comprises: the surface layer material of the present invention; and the aluminum layer provided on the second surface of the surface layer material.

As the aluminum layer, there may be used an aluminum foil or aluminum plate, which can provide properties such as heat resistance, non-flammability and rigidity to the melamine decorative laminate.

This aluminum layer preferably has a thickness of 0.1 mm or more. Thereby, sufficient heat resistance and non-flammability can be provided to the decorative laminate. There is no particular limitation on the upper limit of the thickness. The larger the thickness is, the higher the heat resistance and non-flammability become; however, the larger the thickness and weight of the melamine decorative laminate are, the higher the cost becomes. Therefore, it is preferable to set the thickness in the range that is allowable in terms of design of the final product, and the thickness is preferably set to 0.3 mm or less.

In the aluminum layer, preferably, a surface to be layered on the surface layer material (a surface of the aluminum layer to be in contact with the surface layer material) is subjected to primer treatment with an epoxy resin. Because of this, there is a further increase in the adhesion strength between the surface layer material and the aluminum layer.

<3. Melamine Decorative Laminate>

The melamine decorative laminate of the present invention is obtained by stacking the above-described surface layer material of the present invention and the above-described aluminum layer in a predetermined sequence and heat-pressing them.

In the melamine decorative laminate of the present invention, there is no particular limitation on the condition of heat-pressing the surface layer material and aluminum layer. However, for example, the heat-pressing can be carried out in the following condition: a temperature of 130 to 150° C., a pressure of 5 to 8 MPa, and a time for 10 to 40 minutes.

Upon heat-pressing, a mirrored plate, embossed plate, embossed film or the like can be further layered thereon to form a mirrored or embossed melamine decorative laminate.

As described above, the surface layer material of the present invention can be used in combination with the aluminum layer by stacking. In addition, the material can be used as the surface layer of substrates such as a phenol resin molded plate and plasterboard, and can be layered on such a substrate for use in a variety of applications.

In the melamine decorative laminate of the present invention, besides the surface layer material and the aluminum layer, a protective layer can be further provided on the first surface of the surface layer material. The protective layer can be obtained by impregnating a paper substrate having a basis weight of 10 to 50 g/m² for example with a melamine resin or with a resin composition comprising a melamine resin and an inorganic filler selected from the group consisting of aluminum hydroxide, magnesium hydroxide and silica, and then drying the impregnated paper substrate.

Also in the melamine decorative laminate of the present invention, a core layer comprising a paper substrate impregnated with a phenol resin or the like, can be provided on a surface of the aluminum layer not being in contact with the surface layer material. In addition, an aluminum layer can be further laminated on the outer side of the core layer. By providing the core layer, mechanical strength can be imparted to the melamine decorative laminate. By providing an aluminum layer further on the core layer, there is an improvement in balance of the two sides of the decorative laminate on the whole and thus there is a decrease in warpage of the melamine decorative laminate.

The protective layer and the core layer can be stacked by layering them on the surface layer material and the aluminum layer respectively, and can be subjected to heat-pressing.

EXAMPLES

Hereinafter, the present invention will be described in detail, by way of the following examples.

Example 1

As the surface layer substrate, a titanium oxide-containing decorative paper having a basis weight of 80 g/m² was used.

A coating liquid was prepared by mixing a melamine resin composition (reaction molar ratio: 1.4; resin solid content: 50% by weight, relative to the total melamine resin composition of 100% by weight) with a water-soluble clear type urethane-acrylic resin composition comprising a urethane-acrylic resin emulsion (product name: SU-100; manufactured by: CSC Co., Ltd.; average particle diameter: 84 nm) at a solid content ratio of 90:10 (melamine resin: urethane-acrylic resin). By means of a shower device, the coating liquid was applied to the first surface (design surface) of the substrate, in a coating amount of 50 g/m² in terms of solid content (when dried).

To the second surface of the substrate, the water-soluble clear type urethane-acrylic resin composition comprising a urethane-acrylic resin emulsion (product name: SU-100; manufactured by: CSC Co., Ltd.; average particle diameter: 84 nm) was applied in a coating amount of 40 g/m² in terms of solid content (when dried) and then dried to obtain a surface layer material.

The thus-obtained surface layer material and a 0.3 mm thick aluminum foil were stacked so that the second surface of the surface layer material was put on a primer-treated surface of the aluminum foil, which was subjected to primer treatment with an epoxy resin. The surface layer material and the aluminum foil were subjected to heat-pressing for 20 minutes under the condition of 140° C. and 8 MPa, thus obtaining a 0.5 mm thick sample (1) having a surface layer and an aluminum layer.

Example 2

As the surface layer substrate, a titanium oxide-containing decorative paper having a basis weight of 80 g/m² was used.

To the first surface (design surface) of the substrate, the melamine resin composition (reaction molar ratio: 1.4; resin solid content: 50% by weight) was applied in a coating amount of 50 g/m² in terms of solid content (when dried).

To the second surface of the substrate, the water-soluble clear type urethane-acrylic resin composition comprising a urethane-acrylic resin emulsion (product name: SU-100; manufactured by: CSC Co., Ltd.; average particle diameter: 84 nm) was applied in a coating amount of 40 g/m² in terms of solid content (when dried) and then dried to obtain a surface layer material.

The thus-obtained surface layer material and a 0.1 mm thick aluminum foil were stacked so that the second surface of the surface layer material was put on a primer-treated surface of the aluminum foil, which was subjected to primer treatment with an epoxy resin. The surface layer material and the aluminum foil were subjected to heat-pressing for 20 minutes under the condition of 140° C. and 8 MPa, thus obtaining a 0.3 mm thick sample (2) having a surface layer and an aluminum layer.

Comparative Example 1

As the surface layer substrate, a titanium oxide-containing decorative paper having a basis weight of 80 g/m² was used.

To each of the first and second surfaces of the substrate, the melamine resin composition (reaction molar ratio: 1.4; resin solid content: 50% by weight) was applied in a coating amount of 55 g/m² in terms of solid content (when dried), that is, a total coating amount of 110 g/m², and then dried to obtain a surface layer material.

An adhesive layer material was prepared by applying a resol type phenol resin to a kraft paper having a basis weight of 146 g/m² in a coating amount of 110 g/m² in terms of solid content.

The thus-obtained surface layer material and adhesive layer material were stacked so that the adhesive layer was put on the second surface of the surface layer material. In addition, the primer-treated surface of the aluminum foil used in Example 2 was put on the adhesive layer material. The surface layer material, the adhesive layer material and the aluminum foil were subjected to heat-pressing for 20 minutes under the condition of 140° C. and 8 MPa, thus obtaining a 0.5 mm thick sample (3) having a surface layer, adhesive layer and an aluminum layer.

Comparative Example 2

As the surface layer substrate, a titanium oxide-containing decorative paper having a basis weight of 80 g/m² was used.

To each of the first and second surfaces of the substrate, the melamine resin composition (reaction molar ratio: 1.4; resin solid content: 50% by weight) was applied in a coating amount of 55 g/m² in terms of solid content (when dried), that is, a total coating amount of 110 g/m², and then dried to obtain a surface layer material.

The thus-obtained surface layer material and the aluminum foil used in Example 2 were stacked so that the primer-treated surface of the aluminum foil was put on the second surface of the surface layer material. They were subjected to heat-pressing for 20 minutes under the condition of 140° C. and 8 MPa, thus obtaining a 0.3 mm thick sample (4) having a surface layer and an aluminum layer.

Evaluation of the properties of the samples (1) to (4) obtained in Examples 1 and 2 and Comparative Examples 1 and 2, was conducted. The results are shown in Table 1.

TABLE 1

| Test items | | | Unit | Acceptance criteria | Example 1 | Example 2 | Comparative Example 1 | Comparative Example 2 |
|---|---|---|---|---|---|---|---|---|
| Thickness | | | mm | — | 0.5 | 0.3 | 0.5 | 0.3 |
| Scratch hardness by pencil | | | — | — | 2H | 8H | 8H | 8H |
| Boiling resistance test | | | — | No blisters and no peeling between layers | No blisters and no peeling between layers | No blisters and no peeling between layers | No blisters and no peeling between layers | Blisters found |
| Non-combustibility test | Heat generation test | Total heat | MJ/m² | 8 MJ/m² or less | 4.0 | 4.1 | 6.0 | 3.9 |
| | | Time exceeding 200 KW/m² | Sec. | Less than 10 seconds | 5 | 0 | 0 | 5 |
| | | Through cracks/holes reaching back side | — | None | None | None | None | None |
| | Toxic gas generating property test | Mean time until mice stop acting | Min. | 6.8 Minutes or more | 10 | 14 | 15 | 10 |
| Heat bending test (3R) | | | — | No cracks | No cracks | No cracks | Cracks found | Cracks found |
| Comprehensive evaluation | | | — | — | Passed | Passed | Failed | Failed |

(Test Procedures)

1. Non-Flammability Test

This test was conducted according to "(2)ii)4.10.2 Heat generation test and evaluation process" and "4.10.3 Toxic gas generating property test and evaluation process" under "4.10 Non-combustibility test and evaluation process" of the operation standard "Fire preventive and fireproof performance test and evaluation procedure manual" by General Building Research Corporation of Japan.

Performance evaluation methods are explained in these items of "Fire preventive and fireproof performance test and evaluation procedure manual," which relate to certification based on the provisions in item (ix), Article 2 of the Building Standards Act ("Non-combustible material").

2. Boiling Resistance Test

The samples were treated by the process according to the boiling resistance test of JIS K6902. They were immersed in boiling water for 2 hours and then checked for the presence of blisters and peeling between layers.

3. Bending Test

In accordance with the bending test (Method A) of JIS K6902, the samples were subjected to 3R outward bending at 156° C. Then, they were checked for the presence of cracks on the design surface.

4. Scratch Hardness Test by Pencil

The samples were evaluated according to JIS K5600.

As is clear from the results shown in Table 1, the samples (1) and (2) obtained in Examples 1 and 2 conformed to the acceptance criteria and so on of the non-combustibility test and showed excellent bending properties.

In contrast, the sample (3) obtained in Comparative Example 1 was excellent in non-flammability; however, it showed poor bending properties.

The sample (4) obtained in Comparative Example 2 was excellent in non-flammability; however, it showed poor boiling resistance and poor bending properties.

Example 3

As the surface layer substrate, a titanium oxide-containing decorative paper having a basis weight of 80 g/m$^2$ was used.

To the first surface (design surface) of the substrate, the melamine resin composition (reaction molar ratio: 1.4; resin solid content: 50% by weight) was applied in a coating amount of 50 g/m$^2$ in terms of solid content (when dried).

To the second surface of the substrate, the water-soluble clear type urethane-acrylic resin composition comprising a urethane-acrylic resin emulsion (product name: SU-100; manufactured by: CSC Co., Ltd.; average particle diameter: 84 nm) was applied in a coating amount of 40 g/m$^2$ in terms of solid content (when dried) and then dried to obtain a surface layer material.

The thus-obtained surface layer material was subjected to heat-pressing for 20 minutes under the condition of 140° C. and 8 MPa, thus obtaining a 0.2 mm thick sample (5).

Example 4

As the surface layer substrate, a titanium oxide-containing decorative paper having a basis weight of 140 g/m$^2$ was used.

To the first surface (design surface) of the substrate, the melamine resin composition (reaction molar ratio 1.4, resin solid content 50% by weight) was applied in a coating amount of 85 g/m$^2$ in terms of solid content (when dried).

To the second surface of the substrate, the water-soluble clear type urethane-acrylic resin composition comprising a urethane-acrylic resin emulsion (product name: SU-100; manufactured by: CSC Co., Ltd.; average particle diameter: 84 nm) was applied in a coating amount of 70 g/m$^2$ in terms of solid content (when dried) and then dried to obtain a surface layer material.

The thus-obtained surface layer material was subjected heat-pressing for 20 minutes under the condition of 140° C. and 8 MPa, thus obtaining a 0.3 mm thick sample (6).

Comparative Example 3

As the surface layer substrate, a titanium oxide-containing decorative paper having a basis weight of 80 g/m$^2$ was used.

To the first and second surfaces of the substrate, the melamine resin composition (reaction molar ratio: 1.4; resin solid content: 50% by weight) was applied in a coating amount of 50 g/m$^2$ (first surface) and 40 g/m$^2$ (second surface) respectively, in terms of solid content (when dried), and then dried to obtain a surface layer material.

The thus-obtained surface layer material was subjected to heat-pressing for 20 minutes under the condition of 140° C. and 8 MPa, thus obtaining a 0.2 mm thick sample (7).

Evaluation of the properties of the samples (5) to (7) obtained in Examples 3 and 4 and Comparative Examples 3 was conducted. The results are shown in Table 2.

TABLE 2

| Test items | Unit | Acceptance criteria | Example 3 | Example 4 | Comparative Example 3 |
|---|---|---|---|---|---|
| Thickness | mm | — | 0.2 | 0.3 | 0.2 |
| Stain resistance test | — | No change or slight change | No change | No change | No change |
| Boiling resistance test | — | No blisters | No blisters | No blisters | No blisters |
| Room temperature bending test (3R) | — | No cracks | No cracks | No cracks | Cracks found |
| Scratch hardness by pencil | — | — | 8H | 8H | 8H |
| Comprehensive evaluation | — | — | Passed | Passed | Failed |

(Test Procedures)
1. Stain Resistance Test

The samples were treated by the process according to the stain resistance test of JIS K 6902 (Testing method for laminated thermosetting high-pressure decorative sheets). Then, they were checked for the presence of contaminants remaining on the surface thereof.

2. Boiling Resistance Test

The samples were treated by the process according to the boiling resistance test of JIS K6902. They were immersed in boiling water for 2 hours and then checked for the presence of blisters on the surface thereof.

3. Bending Test

In accordance with the bending test (Method A) of JIS K6902, the samples were subjected to 3R outward bending at room temperature. Then, they were checked for the presence of cracks on the surface thereof.

4. Scratch Hardness Test by Pencil

The samples were evaluated according to JIS K5600.

As is clear from the results shown in Table 2, the samples (5) and (6) obtained in Examples 3 and 4 showed high scratch hardness by pencil; moreover, they were excellent in stain resistance and bending properties.

In contrast, the sample (7) obtained in Comparative Example 3 showed poor bending properties.

INDUSTRIAL APPLICABILITY

The decorative laminate of the present invention has excellent bending properties, excellent non-flammability and excellent adhesion between layers.

In addition, surface layer substrates similar to those used in conventional decorative laminates can be used in the surface layer (decorative layer) of the present invention. Therefore, the present invention can freely select colors and designs without particular limitation compared to conventional decorative laminates, and can be widely used in applications such as doors, which are subject to regulations concerning the material that is required to be non-flammable in public facilities, etc.

REFERENCE SIGNS LIST

12. Melamine decorative laminate
14. Surface layer material
14A. Decorative layer material
16. Aluminum layer

The invention claimed is:

1. A melamine decorative laminate, comprising:

a surface layer material comprising a surface layer substrate having a first surface and a second surface opposite to the first surface, the first surface becoming a design surface of the decorative laminate and being coated with a melamine resin composition comprising a melamine resin, and the second surface being coated with a water-soluble clear resin composition comprising a urethane-acrylic resin emulsion having an average particle diameter of 100 nm or less, and an aluminum layer having a surface coated with an epoxy resin, wherein the surface coated with the epoxy resin of the aluminum layer directly adheres to the second surface coated with the urethane-acrylic resin emulsion of the surface layer material.

2. The melamine decorative laminate according to claim 1, wherein the aluminum layer has a thickness of 0.1 to 0.3 mm.

3. The melamine decorative laminate according to claim 1, wherein the melamine decorative laminate has a 3R outward bendability in accordance with a bending test (Method A) of JIS K6902.

4. A method for preparing a melamine decorative laminate, comprising:

providing a surface layer material, wherein the surface layer material comprises:

a surface layer substrate having a first surface and a second surface opposite to the first surface, the first surface becoming a design surface of the decorative laminate, and the second surface becoming a surface for adhering to an aluminum layer;

wherein the first surface is coated with a melamine resin composition comprising a melamine resin, and the second surface is coated with a water-soluble clear resin composition which comprises a urethane-acrylic resin emulsion having an average particle diameter of 100 nm or less;

providing an aluminum layer, wherein the aluminum layer has a surface coated with an epoxy resin; and adhering the surface coated with the epoxy resin of the aluminum layer directly to the second surface of the surface layer material.

* * * * *